Aug. 9, 1955  C. A. IRETON  2,714,952
LAMINATED PAPER AND PACKAGE MADE THEREFROM
Original Filed Sept. 14, 1943
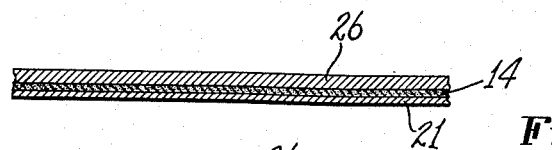
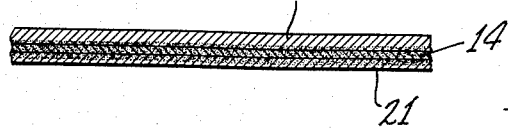
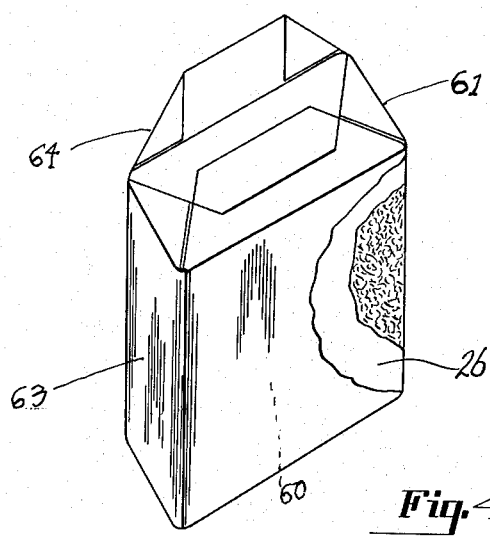
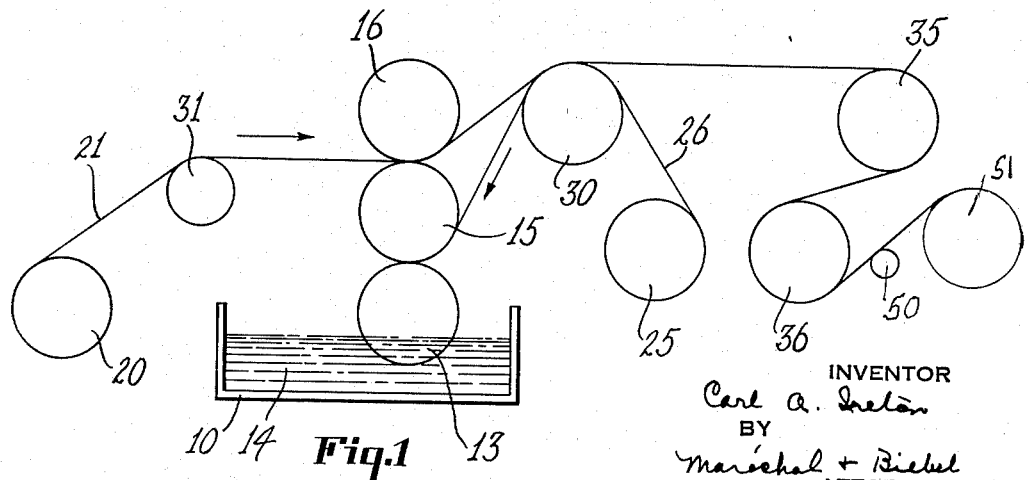
INVENTOR
Carl A. Ireton
BY
Mareschal + Biebel
ATTORNEYS

United States Patent Office 2,714,952
Patented Aug. 9, 1955

2,714,952

LAMINATED PAPER AND PACKAGE MADE THEREFROM

Carl A. Ireton, Dayton, Ohio, assignor to The Specialty Papers Company, Dayton, Ohio, a corporation of Ohio Continuation of abandoned application Serial No. 502,286, September 14, 1943. This application September 9, 1946, Serial No. 695,631

3 Claims. (Cl. 206—48.5)

This invention relates to the manufacture of laminated moisture resistant paper materials, and products made therefrom.

It is one of the principal objects of the invention to provide a composite or laminated sheet or web of paper, with the laminations secured by a laminating material which is impervious or highly resistant to water or moisture, which is relatively soft and pliable and such that the paper may be used in connection with heat-sealing folding and wrapping machines without objectionable penetration of the laminating material through the outside layer to thus avoid objectionable discoloration or staining of the visible surface.

It is another object of the invention to provide such a laminated sheet or web of paper in which the two laminations are secured together by a thermoplastic adhesive material, such as wax or paraffin, which will serve to make the laminated sheet or web impervious to water or highly moistureproof, and in which the characteristics of the composite paper webs are coordinated and controlled with respect to the moistureproof adhesive material, so that the lamination which is to form the outer surface is more resistant to the penetration or spread of the wax therethrough when subjected to heat, such as is encountered in heat-sealing package wrapping machines, than is the case with the inner paper ply.

Still another object of the invention is to provide such a composite or laminated sheet or web, which is impervious to water or has high moistureproofness, in which the inner and outer paper plies or laminations are so prepared with respect to each other, and the character and quantity of the adhesive material that the ply which will be the inner ply in a product, such as a package of smoking tobacco, made from such product will have greater receptivity for the thermoplastic adhesive if subjected to melting temperatures in handling than is true with the layer which will be the outer ply in the completed article, such as the tobacco package referred to.

Another object of the invention is to provide a laminated paper having such a thermoplastic adhesive to secure two sheets or webs, in which the web which will be the outer layer in use, as in the making of packages for tobacco and the like, will have such characteristics as to be more resistant to penetration of the molten adhesive than the cooperating layer which will be concealed from sight, when incorporated in such a package.

Still another object of the invention is to provide apparatus for satisfactorily manufacturing such laminated sheets or webs.

Another object is to provide a method for producing such laminated webs or sheets.

Still other objects and advantages of the invention will be apparent from the description, the accompanying drawing and the appended claims.

In the drawing, in which like reference characters designate like parts—

Fig. 1 is a somewhat diagrammatic showing of apparatus for effecting manufacture of laminated sheets or webs of this invention;

Fig. 2 is a diagrammatic cross-section of such web or sheet, as manufactured and before use to produce a package or carton, such as a package of tobacco or the like;

Fig. 3 is a similar view, with the controlled distribution of the adhesive, which results from heating as in a packaging machine, illustrated diagrammatically and in exaggerated scale; and Fig. 4 is a view in the nature of perspective of a package of smoking tobacco, utilizing the laminated paper of this invention, and with parts broken away to more clearly illustrate the invention.

For purposes of description the invention is described in connection with the figures in the accompanying drawing which illustrate preferred embodiments used for such descriptive purposes. As is well known, many materials which are sold in package or carton form are of such character that it is highly desirable to retain a predetermined moisture content within such packaged material, by preventing the dissipation of moisture through the enclosing package or carton and also by preventing the absorption of objectionable amounts of moisture or other extraneous vapors or gases from its surroundings in places of storage or use; and many efforts have been made to provide packaging materials intended to accomplish this purpose, by the securing together of sheets of paper, or paper and paper board with adhesive or other treatment intended to effect the desired result. The package of pipe tobacco illustrated in the drawing is illustrative of a field of use in which it is highly desirable to have available package forming material which will retain a predetermined moisture content within the packaged tobacco, and which packaging material can be utilized readily in the intricate and expensive heat-sealing packaging machines which are in general use in the tobacco and other industries.

As has been well known it has been the practice, in past years, to utilize metal foils in the preparation of such tobacco or cigarette packages, the foils sometimes being used alone and sometimes having a paper backing, and the whole package being enclosed in an outer cellophane sheet. When used with a paper backing the metal foil, rolled out to be extremely thin, usually has been primarily depended upon to provide moistureproofness, a continuous sheet of metal, free from imperfections, being obviously water impervious. In practice, however, it has been found that such metal foils frequently have pin holes or even smaller and practically imperceptible pores or openings and that a package such as heretofore generally used, depending upon such metal foil and an outer enclosing layer of cellophane will not be truly waterproof, although it would ordinarily have a considerable degree of moisture resistance. Such packages when used for wrapping cigarettes would ordinarily serve adequately to retain the predetermined moisture content within the type of tobacco therein from its time of packaging until its time of use. The moisture content of tobacco when packaged is ordinarily about 12%, and it has been the desired practice to have the moistureproofness of such packages such that the loss of moisture from the time of packaging to the general time of purchase and use would not exceed approximately .5 percent, and losses in excess of that were considered injurious to the character and quality of the cigarette. The percentage of moisture in the tobacco of any particular kind of cigarette, or any particular kind of pipe or chewing tobacco might vary depending upon the controlling moisture characteristics established by the manufacturer thereof; and the initial normal moisture content might also affect the rate of moisture dissipation.

The laminated paper of the present invention is found to be as moistureproof in use, as the packages using metal foils heretofore used in the packaging of tobacco or cigarettes, and to maintain such degree of imperviousness or moistureproofness despite the effect of heating thereof in the heat-sealing of the package in the packaging machine and this too without any objectionable discoloration caused by penetration of the adhesive waxy or thermoplastic material, and without any objectionable effect upon the odor or taste of the tobacco. Tobacco is particularly difficult material to handle in commercial operations of packaging, and to prevent deterioration or objectionable affecting of the desired characteristics imparted thereto by the manufacturer, and the package of pipe tobacco shown in the drawing is therefore illustrative of the use of the laminated paper of this invention in very sensitive operations.

In the manufacture of this laminated paper the two webs or sheets of paper which are to be secured together by the adhesive, such as the waxy material hereinafter described, are specially prepared so as to have predetermined controlled relative characteristics with respect to each other and also with respect to the characteristics of the adhesive and the amount thereof used. Broadly speaking, the two paper webs are specially prepared to be of such predetermined characteristics that they may be adequately adhered with a continuous layer of the water impervious waxy adhesive between them to give the desired composite or laminated web, and with desired limited but definite penetration of adhesive into the surface and body of the respective webs to provide a substantial amount of penetrative bonding of the adhesive to each of the paper webs.

Also the characteristics are so controlled that when the resulting laminated sheet or web is subjected to heat, as in the heat-sealing in a packaging machine, the receptivity of the sheet which is the outer surface will be such that the penetration of wax adesive to the surface of such outer sheet will be entirely or substantially prevented. This is accomplished either by preparing and using webs of paper having controlled absorptivity for the molten adhesive and with the outer layer being more resistant to the penetration of the molten wax than the inner layer, or with the inner layer being more receptive to the penetration of the wax adhesive and also having a greater volumetric capacity so that the wax will flow more readily into the inner layer than into the outer and thus objectional penetration through the outer layer be prevented, while the continuous layer of wax is nvertheless maintained between the two plies of paper to give the desired continuity of adhesive which insures the required moistureproofness, the adhesive wax layer also penetrating a limited but definite distance into each ply of paper to provide substantial penetrative bonding therewith.

It is also contemplated that both the above described controlling factors may be utilized at the same time if desired, that is, the outer layer may be made of a paper which is treated so that the surface which will be in contact with the adhesive is made much more resistant to the penetration of the molten waxy or oily adhesive material while the paper which is to constitute the inner layer will be made to be considerably more readily subject to penetration by the oily heated waxy adhesive and also may be considerably more bulky to provide a reservoir, as it were, of greater volumetric capacity so that molten waxy material would tend to penetrate into the body of the inner layer much more rapidly than it penetrates the more resistant surface of the outer layer, and the characteristics of the inner layer of paper would likewise be such that it could receive and hold within the interstices thereof a considerable quantity of waxy material without its escape into the material being packaged.

Referring to the drawing, the apparatus shown somewhat diagrammatically in Fig. 1 operates quite satisfactorily in effecting lamination of sheets or webs of paper in accordance with this invention. In this apparatus a tank or vat 10 is provided for receiving the molten adhesive, the adhesive being maintained in molten condition by means of heated coils, or jacketed walls (not shown), through which steam or other heated fluid may be passed, or in other ways normally used in the waxed paper industry. Mounted for rotation within this vat is a roll 13, which dips into the body of molten adhesive 14 as shown. Positioned above the roll 13 is a second roll 15 which in turn has a third roll 16 positioned above it. The lower roll operates very satisfactorily when made of metal such as steel which provides sufficient rigidity, and it is preferably provided with a cover such as cloth selected as to character and thickness so that it will pick up the molten waxy adhesive and carry the proper amount of adhesive up into the nip between the rolls 13 and 15. The roll 15 may satisfactorily be made of rubber, or metal covered with rubber, such as used in the waxing industry; and the roll 16 is of similar construction. Each or all of the rolls 13, 15 and 16 may be heated by circulation of steam or other heated fluid through them to give remote control of temperatures for most satisfactory operations, but ordinarily the heat of the waxy adhesive in the vat 10 will be transmitted to all these rolls to keep them at desired temperature during operation.

At one end of the machine is a roll of paper 20, supported by a suitable reel or stand which may be of conventional character and is therefore not illustrated. This roll 20 provides the paper which constitutes the layer which will be the inside layer or lamination when the finished package is made, this inside web of paper being designated by the numeral 21 and traveling in the direction indicated by the arrow.

Shown as similarly supported at the other end of the vat 10 is a second roll of paper 25, which supplies the paper of characteristics predetermined and coordinated with respect to the web 21 so that the web of paper 26 unrolled from this second roll 25 will satisfactorily constitute the outer layer of the laminated sheet when it is formed into the final package or carton. The web 26 passes upwardly and over a roll 30, and then downwardly, in the direction of the indicating arrow, to enter the nip between the rolls 13 and 15. The surfacing, or cloth covering, for the roll 13 is such that it will carry up to the nip the amount of waxy molten adhesive which is required to be transferred to the contacting surface of the web 26 and to remain thereon as it leaves the nip and travels around the roll 15 into the nip between the rolls 15 and 16. As the web 26 is at no time immersed or brought into direct contact with the body 14 of the molten waxy adhesive, the amount of adhesive which may be metered onto the surface of the web 26 to travel around into the nip between the rolls 15 and 16 may be very accurately controlled. Also as none of the molten material comes into contact with this web 26 except as it is brought up into the nip by the roll 13, the time during which the molten adhesive is in contact with the web 26 before the adhesive is then brought into contact with the cooperating side of the web 21 may be limited and controlled as desired.

Also by proper regulation of the cloth covering and its characteristics and the relative hardness of the rolls 13 and 15, and the pressure between such rolls (which may be by conventional pressure adjusting mechanism) the amount of molten adhesive transferred, or squeezed, off of the rol 13 onto the web 26 may be accurately controlled.

The web 21 likewise passes through the nip between the rolls 15 and 16 under sufficient pressure so that the molten adhesive will be caused to adhere uniformly with the coacting surfaces of the two webs 21 and 26. As shown the web 21 is passed upwardly over a roll 31 so that it is led in a substantially horizontal path into the nip between the rolls 15 and 16, and the composite or laminated web, with the adhesive between the two laminations, then passes upwardly and over the roll 30, the laminated web riding over the web 26 at this point with the two traveling in opposite direction. If desired, however, the laminated web may be carried up over a separate roll (above roll 30, and not shown on the drawing) instead of riding over the oppositely traveling web 26.

Also, if desired—as to meet operating conditions—the roll 25 may likewise be positioned at the same end of the machine as the roll 20; in which event it may satisfactorily be led under the vat 10 and then up over the roll 30 to follow thereafter the same lead and steps as described and shown in the drawing.

After leaving the nip of the rolls 15 and 16 the composite web undergoes preliminary cooling in the air as it travels to and over the roll 30 and through the succeeding reach of its path, this preliminary cooling being of a substantially uniform character on both faces of the web.

After such preliminary cooling, the laminated web is then passed over a roll 35 which is chilled sufficiently to start the setting of the wax, and from 35 it passes over a second chilled roll 36 which completes the setting of the wax. The two rolls 35 and 36 are positioned sufficiently close to the nip between the rolls 15 and 16, and the means for refrigerating these two rolls may be so controlled as to give such refrigerating temperatures that the waxy adhesive between the laminations may be set by chilling before the wax penetrates sufficiently into either of the webs 21—26 to "strike through" and be visible upon the unwaxed surfaces. And as will be noted the first chilled roll acts upon the web 26 and thus tends to start the setting of the wax in contact with the web 26 before the other web 21 is brought into direct contact with the second chilled roll, the contacts of the webs with the successive chilling rolls being separated by a brief but definite time interval required for the web to travel from roll 35 to roll 36.

The web 21 is preferably prepared so as to have such controlled characteristics that the molten adhesive tends to penetrate into that web more readily than it does into the web 26. Furthermore, where the paper is to be used for wrapping tobacco or cigarettes, to give a package such as illustrated in Fig. 4, the web 26 is preferably made of a gray color simulating the color of the metal foil heretofore generally used in the packaging of cigarettes, pipe tobacco and the like.

Where pipe tobacco is to be packaged, as shown particularly in Fig. 4, very satisfactory results have been secured when using a stock which weighs 57 pounds per ream of 480 sheets each 24 x 36 inches (which thus has 2880 square feet per side per ream) for the web 26. This paper web 26 is also of such formation that it has a resistance to oil penetration by the so-called "oil flotation test" such that the time for the oil to penetrate or "strike through" by this test will be about 80 to 120 seconds. This oil flotation test, as generally practiced, involves determining the length of time for an oil of a given viscosity to penetrate through the paper when the paper is floated upon oil at a temperature of 90° F. The test as referred to is performed using S. A. E. #40 oil. As compared with ordinary or normal soft waxing paper stock such as most generally used in the making of bread wrappers and the like, such paper has comparatively high oil resistance as the normal soft waxing paper stock would take only about 25 to 40 seconds for penetration, by the same test. If desired this particular stock, the gray stock which will be the outside layer 26, can have its resistance to oil penetration increased by increasing the calendering to condense the surface and make it more resistant to oil penetration, and can be made still more resistant if it is supercalendered while having a higher moisture content of 12% as opposed to the general supercalendering at 5 or 6%. But after any such preparatory operations, the paper still must retain a substantial capacity for absorbing oils, greases, waxes and the like in contra-distinction, for example, to the grease-proof papers such as glassine, vegetable parchment and the like which have substantially no such capacity.

The web 21 is made considerably more responsive to oil penetration than the web 26. This can be accomplished by making this paper as a soft sheet, which is inherently very penetrative by and absorbent of oils; and very satisfactory results have been secured also where the absorbency is increased by incorporating considerable quantites of filler material in the sheet. A very satisfactory laminated product, according to this invention, has been made by using for the web 21, a proper stock which may be ordinary white paper such as, or analogous to, ordinary so-called book paper which is a soft sheet and has about 20% of carbonate filler, such a sheet with this high filler content to increase absorbency showing a value of about 10 to 20 seconds for penetration by the oil flotation test above described. And with a sheet of this character weighing 44 pounds per ream, as above specified, and using approximately 14 pounds of microcrystalline wax per ream as the adhesive, a laminated sheet will be secured in which the wax will not "strike through" either lamination as the sheet is being produced on the machine above described, and the characteristics with respect to absorbency are such that the wax will not strike through the gray outer layer, or at least not objectionably so, when the package shown in Fig. 4 is heat-sealed in a packaging machine, it being understood in the art that these packages are folded generally in the manner shown and sealed by means of a heat responsive adhesive placed upon the folds of the cellophane covering. As heat is applied to the cellophane covering to melt such sealing adhesive, this heat likewise may affect the wax in the laminated web of paper, but because of the folds if any wax shows through at all, it will be a very small amount, right at the fold, and will not objectionably "strike through" or stain or discolor the rest of the paper visible in the package. With a laminated sheet as described the wax may penetrate completely through the inner white layer coming from the web 21, but with the character of sheet referred to the capacity of the white sheet for absorbing the molten wax is such that all of the molten adhesive will be retained within the laminated sheet, and the wax which remains between the two laminations, and that which penetrates into the two sheets in the sealing operation, will give a continuous film of wax which is substantially impervious to moisture, thus providing a package which will have such high moisture resistance that the moisture content of the tobacco will be maintained within the limits referred to above, some leakage of course occurring through unsealed folds and also through the outside cellophane itself.

If desired the white backup stock of the web 21 may be of lighter weight than specified above but in such event results comparable to those specified immediately above can be secured if such web 21 is a bulky paper, of greater caliper, comparable to the 44 pound stock referred to. 25 pound white stock sufficiently bulky to have the absorptive capacity, to provide a sufficient reservoir for the molten wax as it were, has been found to give very satisfactory results. It is to be understood that paper manufacturers readily can control the caliper (or thickness) of a paper web, its bulkiness, its density of surface and web body, its hardness, its softness, and the other herein mentioned characteristics in ways well understood in the paper industry to give the desired characteristics herein specified. For example, a normal calendered book paper of 44 pounds per ream would probably caliper (or have a thickness) of a few thousandths of an inch—say .0025 to .003 inch. Paper of such weight per ream could be made more bulky by proper treatment of the same pulp and method of manufacture and would be more absorptive and thicker.

If it is desired to provide a laminated sheet or web using for the web 26 a stock of lighter weight this can be accomplished by making this web 26 somewhat harder and less subject to penetration by the molten waxy material and also by supercalendering while the web has a high moisture content as above stated. A 27 pound stock of this character, supercalendered at about 12% moisture, may be made to have an oil penetration by the oil flotation test described of about 300 seconds. This increase in resistance to oil penetration will permit of using such a 27 pound paper, preferably gray, in conjunction with a web 21 of a white backing-up stock weighing from 30 to 40 pounds per ream and about 9 pounds of wax per ream between the laminations. Such a white back-up paper of 33 to 35 pounds has been found especially satisfactory in connection with a laminated web for wrapping cigarette packages the paper web 21 being made soft and absorbent by diminished beating and slack sizing so that its oil resistance is about equal to the softest waxing stocks usually used, i. e., about 10 to 20 seconds.

Such a web 26 as referred to would be much less resistant to the penetration of oil than glassine which by the same test has a resistance to oil penetration of from two to five days. This difference is of especial importance if it is desired that the laminated paper be soft and have the somewhat "clammy" feel of the metal foil which has heretofore been used in cigarette packages. A glassine, although very much more oil resistant is nevertheless a harder and tinnier paper and not nearly so adaptable to handling in packaging machines adjusted to the softer materials heretofore used in the cigarette packages. This softer "clammy" paper folds much more readily into the proper package and while its outer layer is actually inherently much less resistant to oil penetration than glassine, nevertheless the utilization of an inner or back-up layer which has greater receptivity to oil penetration in conjunction with an outer or gray layer which is somewhat less penetrable and has much more capacity for absorption, has been found adequately satisfactory in preventing the wax from striking through the paper at all or to any adverse degree.

That is, such a laminated sheet gives adequate moisture-proofness with a suitably flexible wax adhesive between laminations. Especially satisfactory results for tobacco packaging are attained using an adhesive such as microcrystalline wax; and with the wax prevented from all or objectionable bleeding through the outer layer when heat is applied to seal the cellophane outside wrapper, while giving a laminated sheet which is soft and may be readily formed in the machine and has the desired sought-after "clammy" feel of metal foil.

For securing suitable laminated paper, having the desired flexibility and other characteristics above referred to, very satisfactory results can be obtained when the laminating waxy materials is one of the amorphous laminating waxes or the so-called microcrystalline waxes which are commercially available, and in which the wax has the following characteristics, Melting point ASTM ° F _____ 155° F. minimum
Needle penetration at 77° F. ASTM __ 25–35
S. U. viscosity _____ 60–70

Ordinarily waxes having minimum melting points, as determined by the ASTM test, above about 190° F. are not sufficiently flexible for use in laminated papers for making packages such as described herein in the usual packaging machines for making such packages.

A satisfactory commercially available wax meeting these specifications is one sold by Socony-Vacuum Company and designated as "No. 2305."

Also satisfactory results have been obtained using the so-called "Victory Amber" manufactured by Bareco Oil Company which meets the following specifications:

Melting point ASTM ° F _____ 165° minimum
Needle penetration at 77° F. ASTM __ 25–35
S. U. viscosity _____ 75–100

If waxes of the particular specifications above set out as particularly desired, are not available, extenders may be used such as normal paraffin wax or petroleum. The normal paraffin waxes may be more resistant in needle penetration than desired and also may have less flexibility and be less adhesive. A small amount of resinous material added to adhesive compositions having such extenders may be used to retain the characteristics desired. With laminated paper such as described above, using a gray outer layer of paper, the color of the adhesive is not so important especially where the features of this invention are present and absorptivity and oil penetration of the inner and outer laminations and of the adhesive are so controlled that strike through of the adhesive is completely prevented during the manufacture of the laminated web and the heat sealing of the packages, or is prevented in those portions having the gray surface visible from the outside of the package. Some strike through in the folds of the package may be unobjectionable. Also if adhesives of the character referred to are used, which will be completely retained within the laminated layers during manufacture and in the heat sealing, no objectionable odor will be present to affect the tobacco or other material within the package.

In addition the flash point of the adhesive and its gravity are not important, so long as the flash point is well above any operating conditions which may be encountered in the manufacture and use of the laminated webs or sheets.

The laminated webs, with the adhesive properly set by the chilling rolls then passes over the roll 50, which guides the laminated web adequately to a wind-up reel where the laminated paper may be wound into a suitable roll for shipment or future use. This roll is designated by the numeral 51 and the standard or reel on which the roll is wound is not shown in the drawing as it can be of conventional construction.

Fig. 2 shows, in exaggerated scale, a cross-section through a completed laminated sheet, with the layer which will be the outer layer in the package indicated by the numeral 26 and the layer of paper which will be on the inside as a back-up layer indicated by the numeral 21, the wax adhesive between being indicated by the numeral 14. As shown, for illustrative purposes, the operations of applying the wax adhesive and chilling the laminated sheet have been so conducted that there is adequate coherence to or penetration of the wax at the surface zone of the two webs of paper to give better bonding than can be secured without such penetration but the main body of each ply, as shown, is substantially free from waxy adhesive, the penetration having been controlled to that end, as described above. Preferably the outer layer is not given such an oil resistant character as to completely repel penetration during the predetermined limited time the molten adhesive is in contact with its surface before it is chilled and set; but rather it is given a substantial though limited resistance to penetration which is considerably greater than the resistance of the back-up layer so that there may be adequate penetration of both plies to cause firm bonding thereof, while still leaving a large adhesive receiving capacity available for taking in the adhesive melted in the heat-sealing of the package.

In Fig. 3 is shown a similarly diagrammatic view, in exaggerated scale, of the cross-section of the portion of such laminated sheet which has been subjected to the heat of the heat-sealing packaging machine. It will be noted that the inside or back-up layer 21 is substantially filled with the adhesive while the outer, or gray layer 26 has received also a substantial amount of wax adhesive but not sufficient to penetrate completely through the layer and to strike through to the outside surface thereof. This showing is intended to be diagrammatic, and is not necessarily accurately illustrative of the exact amount of wax adhesive received by each layer or the depth of penetration; but it does clearly illustrate that the inside layer is made to receive proportionately a larger quantity of the wax adhesive because it is more subject to penetration by the adhesive; or if the volumetric capacity of the outside layer is substantially greater than that of the inside layer, even though there may be no great discrepancy in the relative rates of penetration, nevertheless because of the greater capacity of the outside layer for wax adhesive the heat-sealing will not cause strike through to the outside surface of the outer layer.

The package shown in Fig. 4 is generally conventional as to form in that it has the size, and folding, and overlapping folds which are made by conventional packaging mechanism as heretofore used. This package is illustrated as containing smoking tobacco, and the tobacco is contained within a sheet of laminated paper as described, wrapped about the tobacco and folded at each end in the manner shown. The body portion of the laminated sheet is designated by the numeral 60 and the one end fold by the numeral 61, the other end being similarly formed. Around this folded package as formed by the packaging machine, is a layer of cellophane 63, which has its ends likewise folded as shown at 64, the cellophane having heat responsive adhesive attached to the edges of the cellophane wrapper and the folds thereof in amount sufficient to give proper sealing when subjected to heat in the packaging machine. As the folded ends 64 are pressed down against the folded ends 61 of laminated paper during the sealing operation there is a tendency for the heat used to also cause some melting of laminating adhesive of the sheet 60 and it is this melting which is controlled as to its penetration in the manner described above to give the results desired. This package is adequately illustrative of the form of final product when cigarettes, as well as smoking tobaccos, are packaged. Since its adhesive does not strike through to pass into the packaged product, is adequately moistureproof and does not impart an odor or stain to the tobacco or other packaged material, it lends itself for use with a variety of materials. Also it is an inexpensive packaging material, as compared to composite metal foil packages for example, and may be made by a simple and inexpensive process with relatively simple and inexpensive equipment.

This application is a continuation of my copending application, Serial No. 502,286, filed September 14, 1943, now abandoned.

While the process of making laminated paper and the apparatus for carrying out said process, and the laminated paper and package and packaged product resulting from use thereof, constitute preferred embodiments of the invention, it is to be understood that the invention is not limited to such precise process, products and apparatus and that changes may be made therein without departing from the scope of the invention which is defined in the appended claims.

What is claimed is:

1. As an article of manufacture a heat-sealed package containing tobacco or similar material which is desired to be maintained within narrow variation of moisture content, said package comprising a sheet of laminated paper in which the two paper plies are adhered by a termoplastic waxy adhesive penetrating a definite but limited distance into each ply, each said ply having substantial reserve capacity for further reception of said adhesive thereby preventing objectionable strike through to the outer surface of one of said plies if said adhesive is melted during a heat sealing operation, the molten adhesive being flexible when solid and at normal temperatures to give a laminated sheet adequately flexible and soft and foldable to be properly formed in a heat sealing packaging machine such as is used for packaging tobacco and the laminated sheet having the "clammy" feel of metal foil used in cigarette packaging, the adhesive distribution in the respective plies of the finished package being such that there is substantial continuity of the moisture resistant waxy adhesive throughout the laminated paper of said package.

2. A laminated sheet of paper for use as a wrapper for the packaging of tobacco, food products and the like, which is soft, flexible and has high moistureproofness and which is foldable and usable in machines for packaging tobacco or the like and having the "clammy" feel of metal foil used in tobacco and cigarette packages, which comprises two sheets of paper laminated by means of a continuous flexible adhesive substantially moisture impervious film comprising microcrystalline wax, the outer of said sheets having an oil penetration by the oil penetration test as described of not less than about 300 seconds and the other of said sheets having an oil penetration by said oil penetration test of about 10–20 seconds, said adhesive having a minimum melting point of 155°, a needle penetration of 25–35 and S. U. viscosity of 60–70, by the standard ASTM test described, with the adhesive material in adhering bonded relation with and penetrating substantially into the opposing inner faces of both plies but not into the respective outer zones of said plies, and with both plies having coordinated absorptivity for said adhesive so that any adhesive melted during heat sealing of a package comprising said laminated wrapper will be absorbed in the body of said outer zone of said plies to prevent objectionable strike through of the outer layer and to effect continuity of distribution of the adhesive in and between said laminations to provide said character of imperviousness or high resistance to moisture transfer.

3. A composite sheet material for forming containers in heat sealing packaging machinery comprising superposed plies one of which is a relatively dense base sheet having a relatively high resistance to penetration by thermoplastic hot melt sealing composition for forming the exterior of the container, another of said plies being a relatively porous sheet material for forming the interior surface of the container having substantially increased receptivity for said thermoplastic hot melt sealing material, an intermediate smooth continuous uniform thermoplastic film of molten adhesive sealing composition including microcrystalline wax, said intermediate flexible wax film combining said base sheet and inner sheet and being confined entirely within the bodies of said plies in controlled distribution therebetween leaving the outer surfaces thereof substantially free of wax and unchanged from their original characteristics prior to a heat sealing operation thereof.

References Cited in the file of this patent

UNITED STATES PATENTS

| Number | Name | Date |
|---|---|---|
| 1,887,844 | Malocsay | Nov. 15, 1932 |
| 2,016,599 | Graves | Oct. 8, 1935 |
| 2,123,760 | Wilshire | July 12, 1938 |
| 2,136,739 | Grant | Nov. 15, 1938 |
| 2,158,754 | Hodgdon | May 16, 1939 |
| 2,161,092 | Rowe | June 6, 1939 |
| 2,227,787 | Laufer | Jan. 7, 1941 |
| 2,248,578 | Moore | July 8, 1941 |
| 2,303,346 | Flood | Dec. 1, 1942 |
| 2,376,899 | Bulatkin | May 29, 1945 |
| 2,402,870 | Burgess et al. | June 25, 1946 |
| 2,474,619 | Farrell et al. | June 28, 1949 |